(12) United States Patent
Schautt (10) Patent No.: US 6,978,868 B2
(45) Date of Patent: Dec. 27, 2005

(54) ELECTROMECHANICAL BRAKE WITH ZERO BACKLASH ACTUATION

(75) Inventor: Martin Schautt, München (DE)

(73) Assignee: eSTOP GmbH, Grafrath (DE)

( * ) Notice: Subject to any disclaimer, the term of this patent is extended or adjusted under 35 U.S.C. 154(b) by 0 days.

(21) Appl. No.: 10/718,076

(22) Filed: Nov. 20, 2003

(65) Prior Publication Data
US 2004/0108175 A1 Jun. 10, 2004

Related U.S. Application Data

(63) Continuation of application No. PCT/EP02/05431, filed on May 16, 2002.

(30) Foreign Application Priority Data
May 21, 2001 (DE) .......................................... 101 24 754

(51) Int. Cl.[7] ............................................... F16D 55/08
(52) U.S. Cl. .................... 188/72.7; 188/72.2; 188/70 B
(58) Field of Search ............................. 188/72.7, 72.2, 188/136, 70 B, 106 P (56) References Cited

U.S. PATENT DOCUMENTS

| | | | | |
|---|---|---|---|---|
| 3,315,769 A | * | 4/1967 | Francois | 188/72.2 |
| 3,425,519 A | * | 2/1969 | Frigger | 188/72.3 |
| 3,430,736 A | * | 3/1969 | Long | 188/72.7 |
| 3,543,285 A | * | 11/1970 | Frigger | 188/106 F |
| 3,662,864 A | * | 5/1972 | Evans | 188/72.2 |
| 3,869,024 A | | 3/1975 | Hauth et al. | |
| 4,295,548 A | * | 10/1981 | Quiney | 188/72.7 |
| 4,457,408 A | * | 7/1984 | Montalvo, III | 188/72.2 |
| 4,593,795 A | * | 6/1986 | Cox, Jr. | 188/71.3 |
| 6,318,513 B1 | * | 11/2001 | Dietrich et al. | 188/72.7 |
| 6,332,514 B1 | * | 12/2001 | Chen | 188/72.7 |
| 6,752,247 B2 | * | 6/2004 | Hartsock | 188/72.7 |
| 6,802,402 B2 | * | 10/2004 | Bausch et al. | 188/171 |

FOREIGN PATENT DOCUMENTS

| | | |
|---|---|---|
| DE | 1078886 | 3/1960 |
| DE | 19819564 | 12/1999 |
| DE | 19851668 | 5/2000 |
| DE | 19957939 | 5/2001 |
| WO | 98/14715 | 4/1998 |

* cited by examiner

Primary Examiner—Robert A. Siconolfi
(74) Attorney, Agent, or Firm—Wood, Herron & Evans, L.L.P.

(57) ABSTRACT

The invention relates to an electromechanical brake (10), especially for vehicles, comprising an electrical actuator generating an actuation force and acting upon at least one friction member (16) in order to press said member to elicit a frictional force against a rotational component (14), which is to be braked, of the brake. The invention also comprises a self-boosting device arranged between the friction member (16) and the electrical actuator, said device serving to self-boost the actuation force generated by the electrical actuator. The invention further comprises at least one wedge (18) with an angle of inclination α that is supported on a corresponding counter bearing (22). In order to improve the adjustability of said brake (10), the electrical actuator has two drive mechanisms (34, 34') which act upon the wedge (18) and can work against each other to generate the actuation force with the purpose of zero backlash actuation of the brake (10). In the range of low actuation forces, i.e. in a range tan $\alpha \approx \mu$, where $\mu$ is the friction coefficient between the friction member (16) and the component (14) to be braked, the two drive mechanisms (34,34') work against each other to generate the actuation force.

14 Claims, 8 Drawing Sheets

ELECTROMECHANICAL BRAKE WITH ZERO BACKLASH ACTUATION

This application is a continuation of the "parent" PCT International Patent Application Number PCT/EP02/05431, entitled "Electromechanical Brake With Zero Backlash Actuation," filed on May 16, 2002, which designates the United States, and which claims priority to German Application Number DE 101 24 754.0, filed on May 21, 2001.

The invention relates to an electromechanical brake, especially for vehicles, comprising an electrical actuator generating an actuation force and acting upon at least one friction member in order to press said member to elicit a friction force against a rotational component, which is to be braked, of the brake. The invention also comprises a self-boosting device arranged between the friction member and the electrical actuator, said device serving to self-boost the actuation force generated by the electrical actuator. The invention further comprises at least one wedge with an angle of inclination $\alpha$ that is supported on a corresponding counter bearing.

An electromechanical brake with a self-boosting device is known from German patent specification DE 198 19 564 C2. In the case of the brake described in this document, there is the problem that the amount of self-boosting, defined by the choice of the angle of inclination $\alpha$, can only ever be so large that irrespective of the coefficient of friction $\mu$ (which changes depending on the operating state of the brake) between the friction lining and the component to be braked, either always a compressive force or always a tensile force is exerted on the wedge of the self-boosting device. A change of sign of the actuator force should be avoided, since otherwise the backlash in the actuator must be crossed, resulting in undefined states and thus unwanted variations of the controlled variable (braking force). Because of these restrictions, with the known electromechanical brake the range of optimum self-boosting, that is the range in which the value of the coefficient of friction $\mu$ corresponds at least approximately to the value $\tan \alpha$, cannot be used, because at the point of optimum self-boosting, i.e. when the coefficient of friction $\mu$ has the same value as the tangent of the angle of inclination $\alpha$, the required actuation force, i.e. the actuator force, changes its direction.

The invention is therefore based on the object of providing an improved electromechanical brake with self-boosting, the working range of which can be in the range of optimum self-boosting without negative effects regarding its adjustability.

Starting from an electromechanical brake as described above, this object is achieved according to the invention in that the electrical actuator has two drive mechanisms which act on the wedge of the self-boosting device and can work against each other to generate the actuation force. In the range of low actuation forces, i.e. in a range $\tan \alpha$ approximately equal to $\mu$, the two drive mechanisms work against each other to generate the actuation force. "Work against each other" here means that the forces which are applied by the two drive mechanisms on the wedge of the self-boosting device are opposite in direction. According to one embodiment of the brake according to the invention, in the range of low actuation forces the two drive mechanisms pull on the wedge of the self-boosting device to generate the actuation force, in such a way that a tensile force excess in the actuation direction, representing the actuation force, results. In an alternative embodiment, the two drive mechanisms, if only low actuation forces are required, press on the wedge of the self-boosting device to generate the actuation force, in such a way that a compressive force excess in the actuation direction, representing the actuation force, results.

Thus according to the invention, the two drive mechanisms of the electrical actuator, if only low actuation forces are required, that is if the self-boosting of the brake is high (i.e. if $\tan \alpha$ is approximately equal to $\mu$), work together in a zero backlash manner, because the backlash which is present in the actuator does not appear because the two drive mechanisms act against each other. A change of sign of the actuator force, which can easily occur in the high self-boosting range, therefore has no negative effects, but is overcome with zero backlash. The brake according to the invention can therefore be operated in the optimum self-boosting range without any problems, which also means that the electrical actuator needs to be less powerful and can therefore be implemented in more compact, lighter form. In addition to the saving of space and weight, there are also advantages for the dynamic behaviour of the actuator.

In operating states in which the value of the coefficient of friction $\mu$ differs greatly from the value $\tan \alpha$, the electrical actuator must provide a greater actuation force to achieve the required braking force or braking moment. According to a preferred embodiment of the brake according to the invention, therefore, the working directions of the two drive mechanisms of the electrical actuator can be reversed, in such a way that the two drive mechanisms, to achieve higher actuation forces, work with each other (i.e. in the same direction and not in opposite directions as before). Admittedly, in such operating states, situations in which the backlash of an actuator has to be overcome can occur, but in the rare cases in which the two drive mechanisms must work together to achieve higher actuation forces, for instance in the case of emergency braking, this does not result in any real disadvantage, since with the forces which are then acting the actuator backlash is very quickly overcome, and is noticeable in the brake actuating element at most as a small knock, which is triggered by the abrupt change of force when the actuator of which the backlash has been overcome engages again. If the backlash is known, this abrupt change of force can also be adjusted out if desired.

In general, the angle of inclination $\alpha$ of the self-boosting device for the brake according to the invention must be chosen so that the brake can still generate the required compressive force to generate the maximum required braking moment even with the maximum and minimum coefficients of friction $\mu$ which occur in operation.

In other words, the angle of inclination $\alpha$ should be chosen so that $\mu_{min} < \tan \alpha < \mu_{max}$. Preferably, the two drive mechanisms of the electrical actuator of the brake according to the invention are implemented as linear actuators, which both act is directly on the wedge(s) of the self-boosting device. With such an embodiment, the friction member, usually a friction lining, is preferably permanently joined to the wedge, so that every movement of the wedge is transmitted to the friction member without loss. According to a preferred embodiment, each linear actuator has an electric motor with integrated spindle nut, a spindle which is in the form of a connecting rod and works with the spindle nut, and a rotation angle sensor or other position sensor. On the basis of the signals which the position sensors of the linear actuators supply, on the one hand the mechanical backlash which is present in the electrical actuator can be determined, and on the other hand the present position of the wedge can be determined immediately.

In preferred embodiments of the brake according to the invention, the wedge(s) of the self-boosting device is/are controlled for position. Preferably, the position control of the wedge is cascade control with an outer control loop, the controlled variable of which is the braking moment and the manipulated variable is the position of the friction member which is joined to the wedge, and with an inner control loop, the controlled variable of which is the position (which is determined from the position signals of the linear actuators) of the friction member which is joined to the wedge, and the manipulated variable is the motor current or motor voltage of the electric motors of the linear actuators. Position control of the wedge, and in particular the described cascade control, is advantageous from a control engineering point of view, because between the coefficient of friction $\mu$ and the wedge position there is only a linear relationship. Such control is therefore fast, precise and not liable to faults.

In preferred embodiments of the brake according to the invention, the wedge, or each wedge of the self-boosting device for each of the two directions of rotation of the component to be braked, has at least one wedge surface. Preferably, the angle of inclination of the different wedge surfaces which are provided for the two directions of rotation is the same, so that the wedge has a symmetrical structure, but the angles of inclination for forward and reverse rotation of the component to be braked can also be chosen to be different.

Usually, brakes have not just one friction member, but at least two friction members, which are opposite each other and act on different sides of the component to be braked. Preferably, therefore, the counter bearing for the wedge of the self-boosting device is supported on a caliper, which overlaps the component to be braked and is joined to the other friction member. In a specially preferred embodiment of the brake according to the invention, the component to be braked is a brake disc, and is the caliper is a sliding caliper. Sliding-caliper disc brakes and the principle on which they function are well known to persons skilled in the art in the area being discussed here, so that further explanation is unnecessary.

As in the case of the brake which is known from DE 198 19 564 C2, in the case of the brake according to the invention there is preferably a device to compare a setpoint value of the friction force with the actual value of the friction force. When the actual value deviates from the setpoint value, the device triggers the electrical actuator to increase or reduce the generated actuation force correspondingly, and thus make the actual value of the friction force equal to the setpoint value. In other words, the brake according to the invention is preferably controlled for friction force. The friction force corresponds to the braking force or braking moment except for its sign.

All embodiments of the brake according to the invention can be in such a form that the angle of inclination $\alpha$ of the wedge surface falls as the wedge is pushed further in the actuation direction, i.e. the angle of inclination becomes less over the feed path of the brake. In this way, even better control behaviour of the brake according to the invention can be achieved.

In a modified embodiment of the brake according to the invention, the electrical actuator is a linear motor, the thrust member of which acts on the wedge of the self-boosting device. Because a linear motor per se has no backlash, in such an embodiment two drive mechanisms acting against each other are not required, and a single drive mechanism is enough.

An embodiment of a brake according to the invention is described in more detail below, on the basis of the attached schematic figures.

Figure 1:
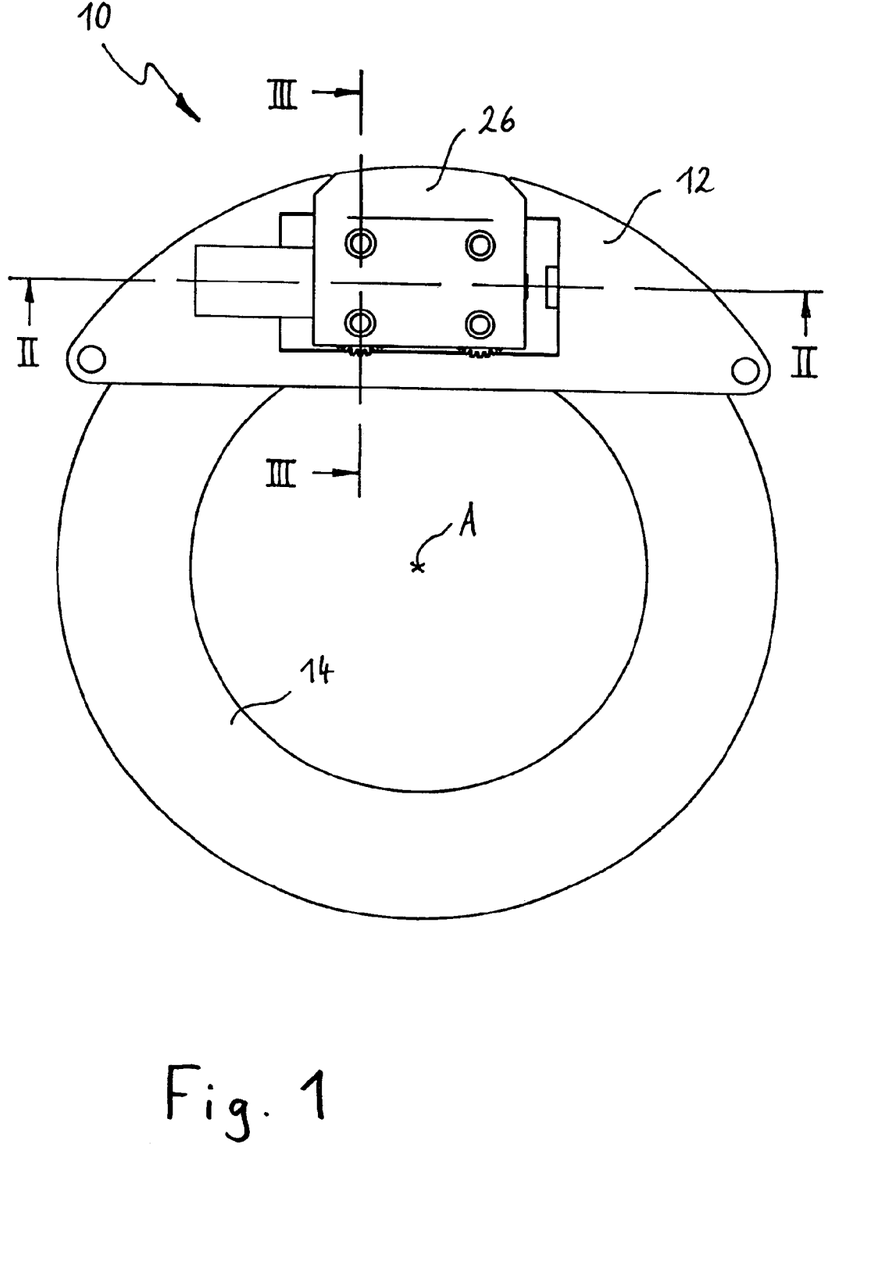
FIG. 1 shows an electromechanical brake, in the form of a disc brake, from the side.
Figure 2:
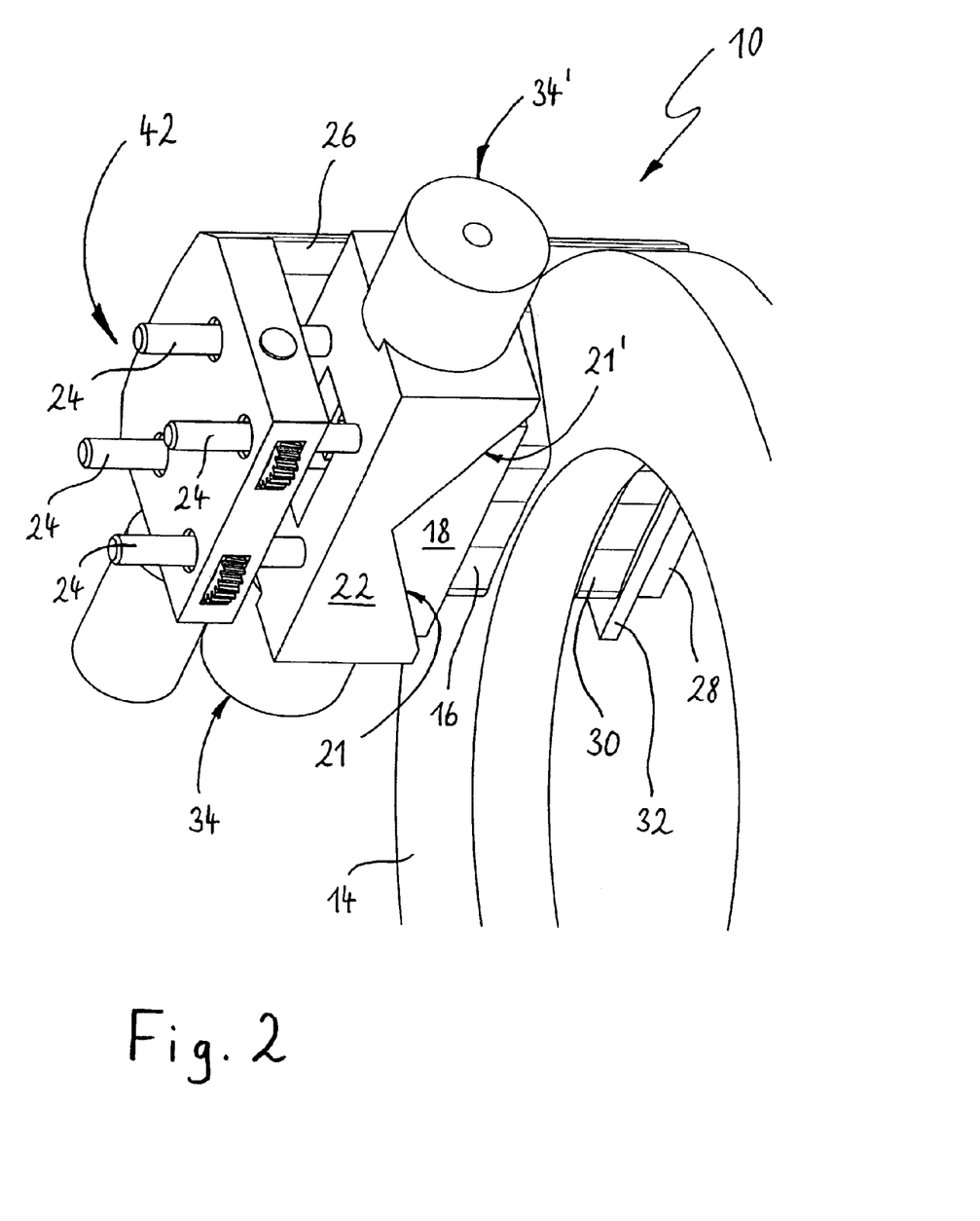
FIG. 2 shows a spatial view of the brake according to the invention from diagonally below.

FIGS. 1 and 2 show an electromechanical brake 10 in the form of a disc brake, with a housing 12 and a brake disc 14 which can be rotated around an axis A.

Figure 3:
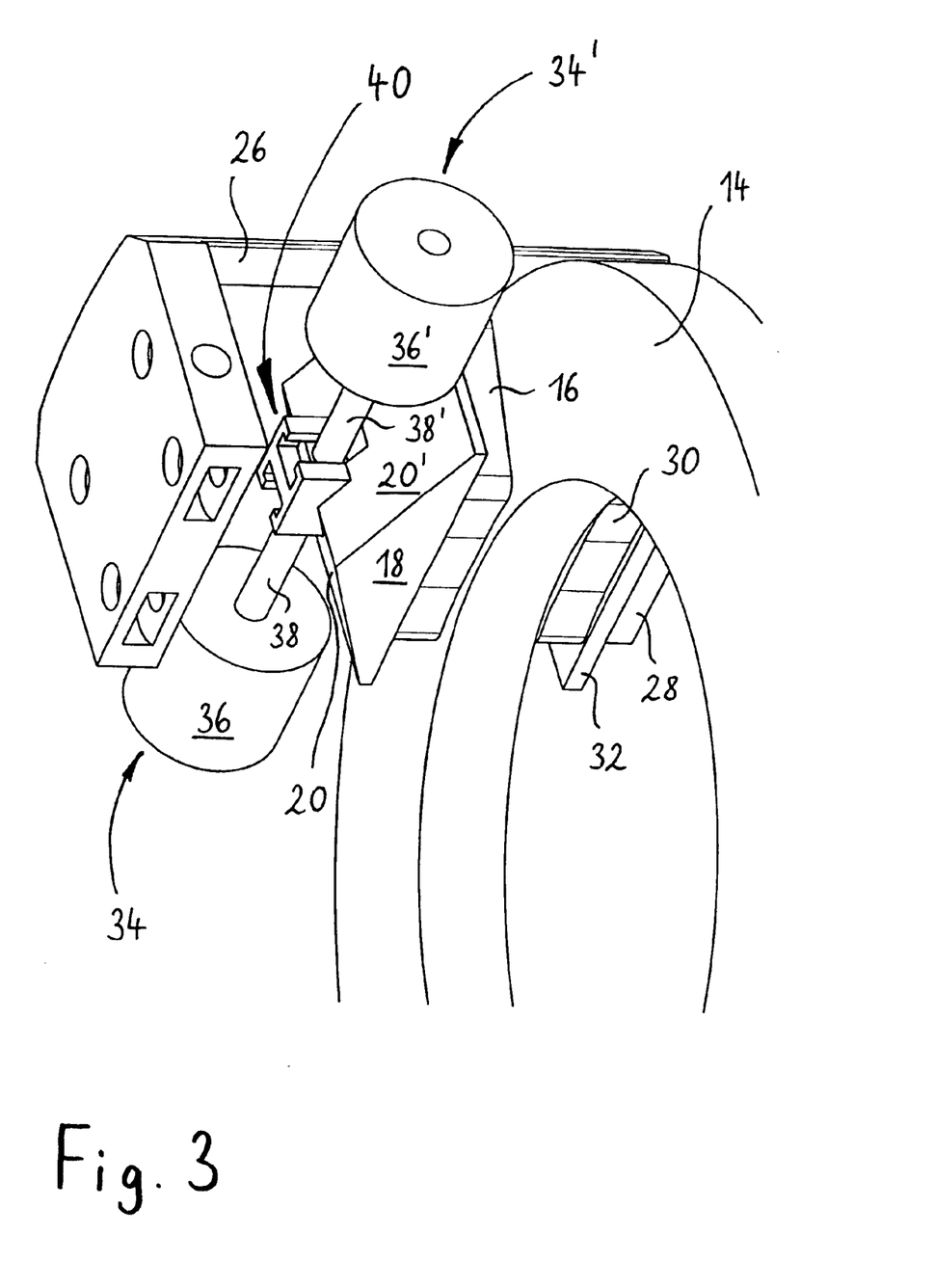
FIG. 3 shows the view from FIG. 2 without the adjustment device and counter bearing.
Figure 4:
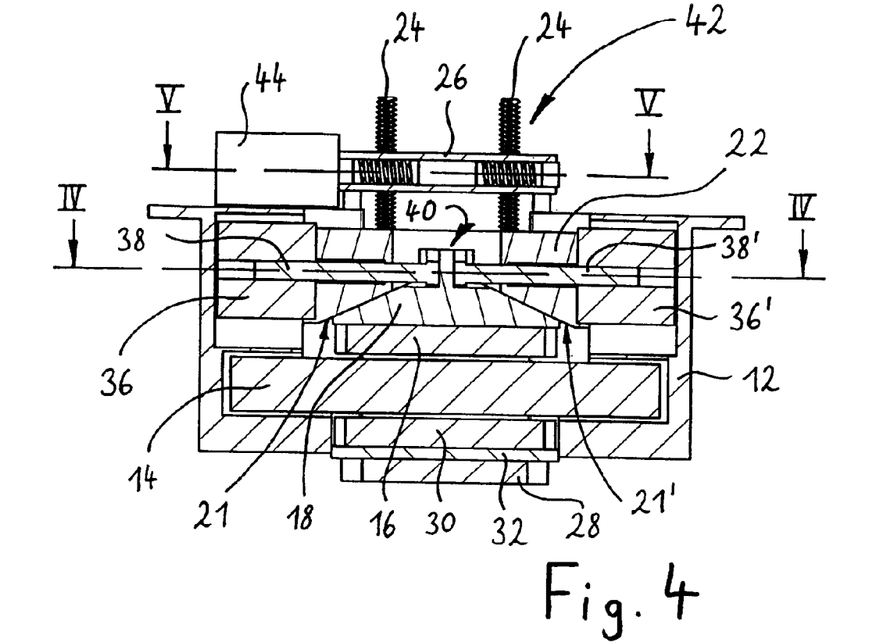
FIG. 4 shows the cross-section II—II from FIG. 1.
Figure 5:
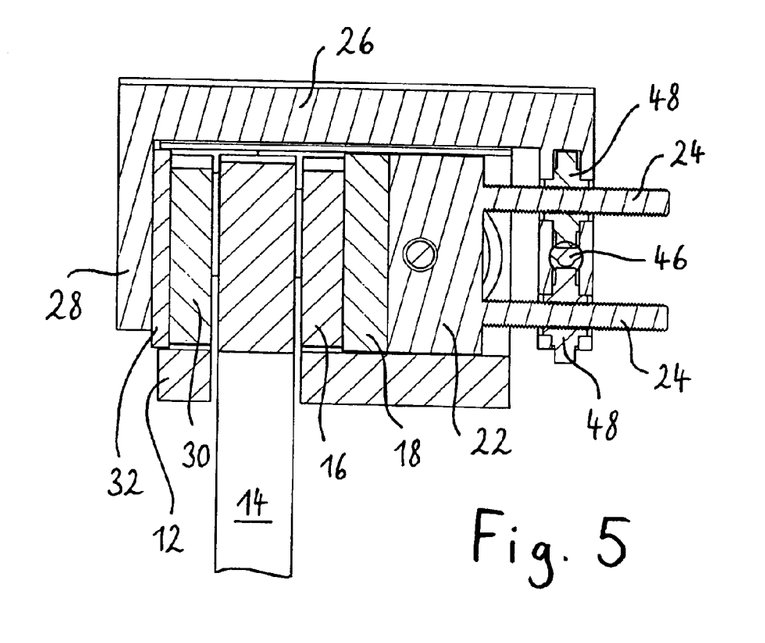
FIG. 5 shows the cross-section III—III from FIG. 1.

As can better be seen from FIGS. 3, 4 and 5, the brake 10 has a first friction lining 16, which is permanently joined, e.g. by adhesive, to the front side of a wedge 18 which carries the lining. On its back, the wedge 18 has a wedge surface 20 and 20' for each direction of rotation of the brake disc 14. Both of them are arranged at an angle of inclination $\alpha$ to the brake disc 14 and are supported on complementary wedge surfaces 21, 21' of a block-shaped counter bearing 22.

The counter bearing 22 is supported via four threaded bolts 24 on a brake caliper 26 (see FIGS. 2 and 5), which extends over the brake disc 14 and has an arm 28 which is directed towards the axis of rotation A. The purpose of the arm 28 is to support a second friction lining 30, which is fixed in the usual way on a lining support plate 32, which lies on the inner side of the arm 28, facing the brake disc 14.

The actuation force of the brake 10 is generated by an electrical actuator, which comprises two drive mechanisms 34 and 34', which are implemented here as linear actuators. Each drive mechanism 34, 34' includes an electric motor 36, 36', and a connecting rod 38, 38' which it drives, and which is connected mechanically to the wedge 18. In the embodiment shown here, each electric motor 36, 36' has an integrated spindle nut (not shown), and the connecting rods 38, 38' are each in the form of spindles which work with the spindle nut. A rotation angle sensor, also not shown, in each electric motor 36, 36' makes it possible to determine the precise position of the associated connecting rod 38, 38' on the basis of the rotations by the electric motor 36 or 36' and the inclination of the spindle drive.

Figure 6:
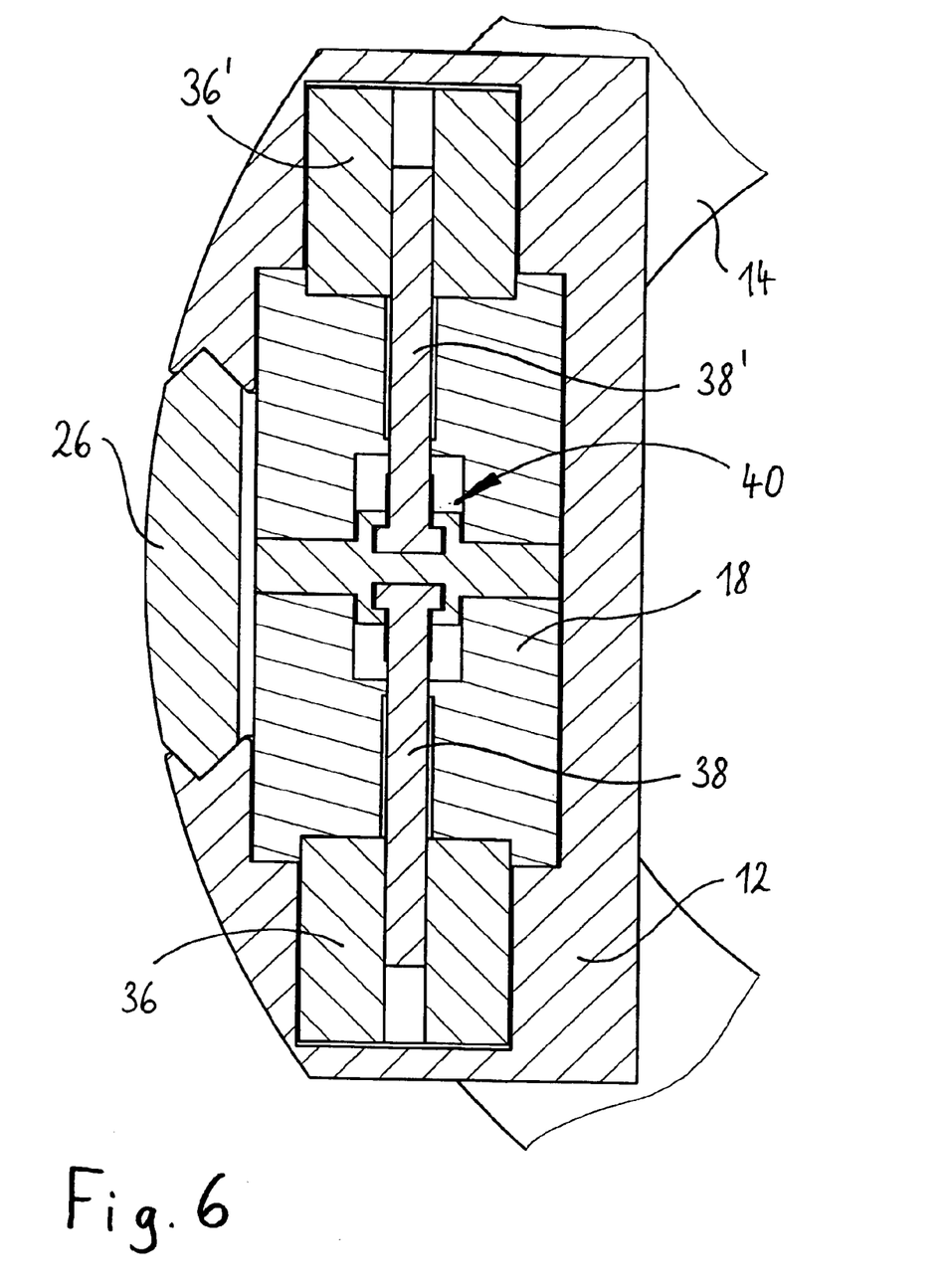
FIG. 6 shows the cross-section IV—IV from FIG. 4.
Figure 7:
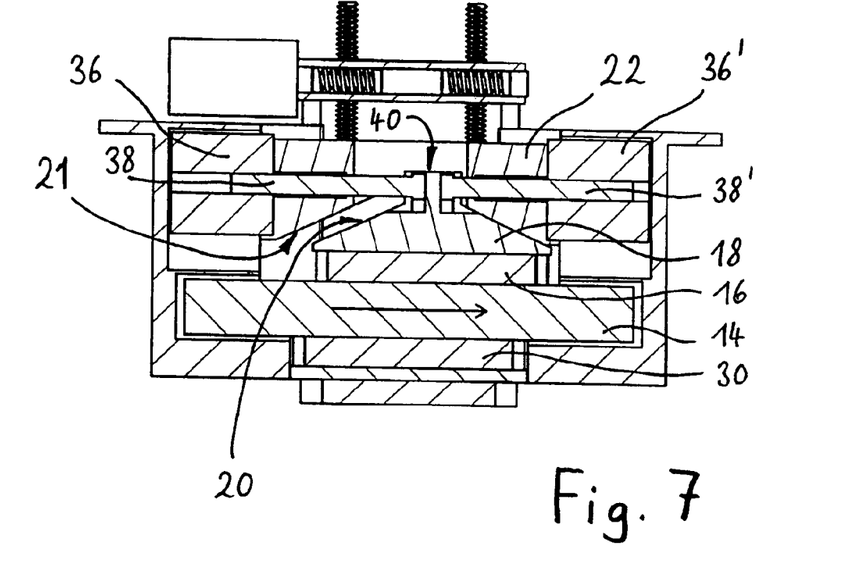
FIG. 7 shows a cross-section view according to FIG. 4, showing the actuated state of the brake according to the invention during forward motion.
Figure 8:
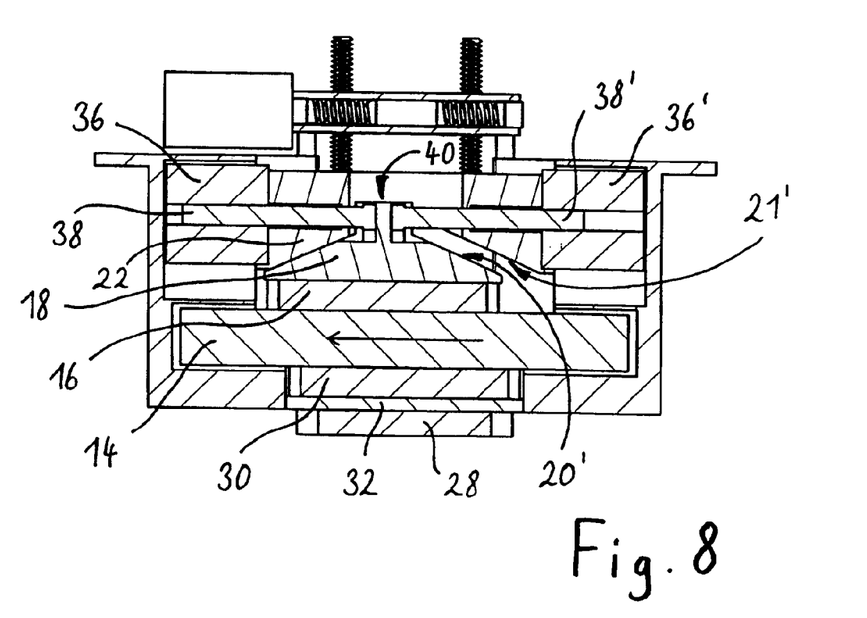
FIG. 8 shows the cross-section view from FIG. 7, but now for an actuated state of the brake during reverse motion.

The wedge 18 and counter bearing 22 are parts of a self-boosting device to boost the actuation force which the drive mechanisms 34, 34' generate. For this purpose, the free ends of the connecting rods 38 and 38' are carried in a receptacle 40 on the back of the wedge 18, in such a way that a translation movement of the connecting rods 38, 38' results in a corresponding movement of the wedge 18 to the left or right (see FIGS. 3, 4 and 6). To actuate the brake 10, therefore, the wedge 18, with the friction lining 16 which is fixed to it, is moved in the direction of rotation of the brake disc 14 (see FIGS. 7 and 8) by a translation movement of the two connecting rods 38 and 38'. The wedge 18 is supported via one of its wedge surfaces 20 or 20' on the associated complementary wedge surface 21 or 21' of the counter bearing 22, and not only moves to the left or right, but also towards the brake disc 14. As soon as the first friction lining 16 comes into contact with the brake disc 14, a reaction force results, and is transmitted by the friction lining 16 via the wedge 18 and counter bearing 22 onto the brake caliper 26. The brake caliper 26 is carried on the housing 12 of the brake 10 so that it slides, and is pushed by the above-mentioned reaction force until the second friction lining 30 also lies on the brake disc 14 (sliding caliper principle). Every further translatory movement of the wedge 18 in the actuation direction now results in the two friction linings 16 and 30 being pressed more strongly onto the brake disc 14, and thus results in the desired braking event. The brake is released by moving the wedge 18 back into its initial position as shown in FIG. 4. To reduce the friction, the wedge surfaces 20, 20' and/or the counter bearing surfaces 21, 21' can, for instance, be provided with rolling elements (not shown). As shown, the receptacle 40 is in such a form that the wedge 18 can move in the direction towards the brake disc 14 and away from it, without the connecting rods 38, 38' also making this movement.

Figure 9:
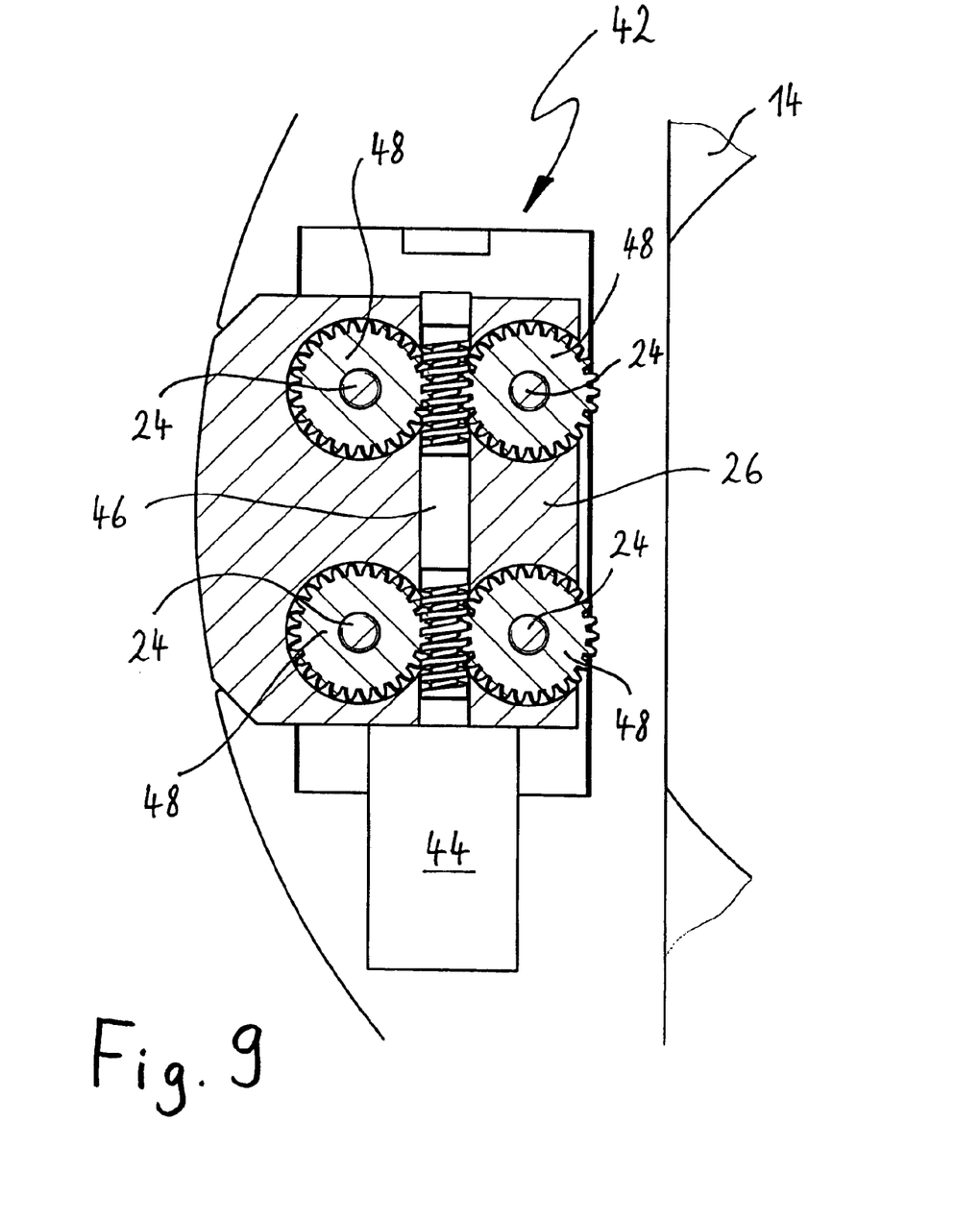
FIG. 9 shows the cross-section V—V from FIG. 4.
Figure 10:
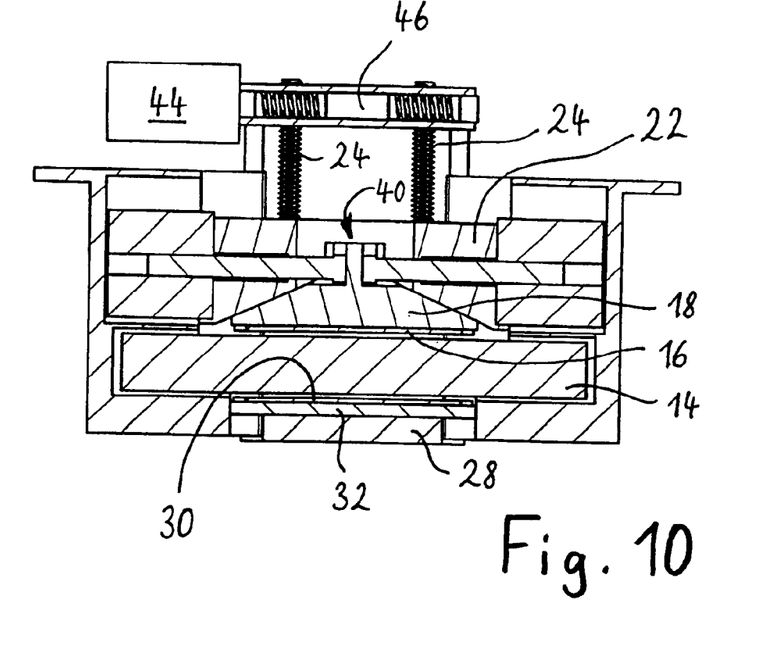
FIG. 10 shows the cross-section view from FIG. 4 with extensively worn friction linings.

So that the brake 10 can compensate for a worn friction lining 16, there is an adjustment device, which is identified generally by 42 (see FIG. 2). This consists (see FIGS. 4, 5 and 9) of a motor 44, which drives a worm shaft 46, which engages with four gear wheels 48. The gear wheels 48 are carried in the brake caliper 26, and each have an internal thread, which engages with an appropriate one of the threaded bolts 24, which are permanently joined to the counter bearing 22 (see FIG. 5). The gear wheels 48 thus function as spindle nuts of a spindle drive, whereas the threaded bolts 24 represent the spindle rods. In the shown embodiment, there are four threaded bolts 24, of which, because of the different directions of rotation of the gear wheels 48, two threaded bolts 24 have a left-hand thread, and the other two threaded bolts 24 have a right-hand thread. Using the motor 44, the adjustment device 42 can thus increase the gap between the counter bearing 22 and the brake caliper 26, i.e. move the counter bearing 22 in the direction of the brake disc 14. In this way, the air gap of the brake 10, i.e. the gap which exists between the brake disc 14 and the surface of the friction lining when the brake is released, can be kept constant. FIG. 10 shows this in a view corresponding to FIG. 4, but with extensively worn friction linings 16, 30.

Usually, the brake 10 is implemented so that if too large a air gap is detected during braking, a feedback control activates the adjustment device 42 when the brake is released, in order to reduce the air gap back to the value specified by the design. The adjustment device 42 is preferably in a self-inhibiting form, to prevent unintentional adjustment of the air gap.

The adjustment device 42 described here represents one possible way of compensating for friction lining wear. Instead of the above-mentioned electric motor 44, other embodiments of the brake 10 can have an ultrasound motor, a sequence processor, a stepping motor or another drive mechanism. The gearing of the adjustment device 42 can also be implemented differently, for instance as harmonic drive gearing. Also, there do not have to be four threaded bolts 24 as shown. There can be more or fewer threaded bolts. Finally, other means than threaded bolts are conceivable to achieve the described relative movement of the counter bearing 22.

Figure 11:
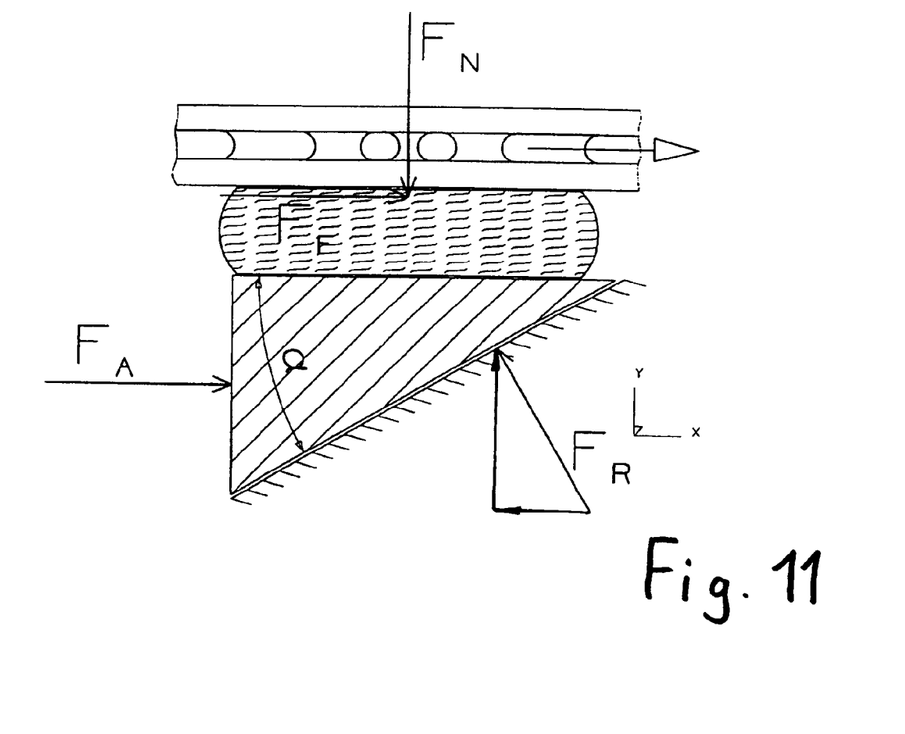
FIG. 11 shows a diagram which illustrates the basic functioning of the brake according to the invention.

Below, the functioning of the electromechanical brake 10, and in particular of the self-boosting device, is explained in more detail on the basis of FIG. 11. It has already been mentioned that the self-boosting device, for each direction of rotation of the brake disc 14, has a wedge surface 20 and 20', which is supported on a complementarily formed surface 21 and 21' of the counter bearing 22. In the shown embodiment, each wedge surface 20, 20' is arranged in relation to the brake disc 14 at an effective wedge angle α. However, this does not have to be true. Instead, the effective wedge angle for one direction of rotation can differ from the effective wedge angle for the other direction of rotation. In FIG. 11, the forces which act on the wedge 18 are shown with arrows.

$F_A$ is the input force which is introduced into the wedge 18, $F_R$ is the bearing force which results during braking, is supported by the counter bearing 22, and can be divided into a force $F_{Rx}$ which is opposite to the input force $F_A$ and a compressive force $F_{Ry}$ which is vertical to the brake disc, $F_N$ is the normal force on the brake disc, and is opposite to the force $F_{Ry}$, and $F_F$ is the resulting friction force on the wedge and on the friction member.

According to this equilibrium of forces, the friction force and friction moment on the brake disc 14, according to the relationship $$F_A = -F_F \cdot \left[1 - \frac{\tan\alpha}{\mu}\right]$$

depends only on the angle of inclination α, the coefficient of friction μ, which represents a disturbance variable, and the input force $F_A$.

The input force $F_A$, which according to FIG. 11 acts on the wedge 18 when the brake is actuated, is generated by the two drive mechanisms 34, 34'. For a given coefficient of friction μ, the amount of self-boosting of the introduced force $F_A$ depends only on the angle of inclination α. In the equilibrium state, i.e. when the value of the coefficient of friction μ equals the tangent of the angle of inclination a, the brake 10—if the friction lining 16 is in contact with the brake disc 14—requires no more input force $F_A$ for further braking. This equilibrium state is therefore also called the point of optimum self-boosting. If μ is less than tan α, an input force $F_A$ must be present to maintain the braking. On the other hand, if μ is greater than tan α, the brake closes of its own accord, i.e. the braking force is boosted more and more, without the presence of an input force $F_A$, until the brake locks. If this locking state is to be avoided or a desired braking force is to be maintained, a negative input force $F_A$, i.e. an input force $F_A$ acting in the opposite direction on the wedge 18, must be applied.

So that the input force $F_A$ can be small, the aim is to operate the brake 10 in a range in which the coefficient of friction μ is at least approximately equal to the tangent of the angle of inclination α. In this range of low actuation forces, the two drive mechanisms 34 and 34' act against each other, i.e. the two drive mechanisms 34, 34' introduce opposite forces into the wedge 18 via the connecting rods 38, 38'. The opposite forces are dimensioned so that an excess of force results, in the direction in which the wedge 18 is to be pushed on actuation. The two forces which are introduced into the wedge 18 by the drive mechanisms 34, 34' can both be compressive forces or both tensile forces. All that matters is that an excess of force in the desired direction results.

The opposite working of the two drive mechanisms 34, 34' results in zero backlash actuation of the wedge 18. This zero backlash is important for the operation of the brake 10 in the range of optimum self-boosting, because in this range, because of the coefficient of friction μ which changes during the operation of the brake, there can be a rapid change between states in which $\mu$ is less than tan $\alpha$ and states in which $\mu$ is greater than tan $\alpha$. In other words, in the range around the point of optimum self-boosting, there can be a rapid change between states in which a positive input force $F_A$ is required and states in which a negative input force $F_A$ is required, to maintain a specified, desired braking force. If the actuator did not have zero backlash, at every change of sign of the input force $F_A$ the backlash which is present in the actuator would be run through, which would result in undefined states and thus to bad controllability of the brake. Zero backlash actuation using the two drive mechanisms 34, 34', which in the normal case work in opposite directions, effectively avoids this problem.

In operating states in which the value of the coefficient of friction $\mu$ differs greatly from the tangent of the angle of inclination $\alpha$, greater input forces $F_A$ are required to achieve a desired braking effect. In such operating states, the two drive mechanisms 34, 34' work with each other, i.e. they generate forces in the same direction, one of the drive mechanisms pressing on the wedge 18 and the other drive mechanism pulling on the wedge 18. So that such working of the drive mechanisms in the same direction is possible, the two drive mechanisms 34, 34' are in reversible form, i.e. their actuation direction can be reversed. When the drive mechanisms 34, 34' are operated in the same direction, the actuator of the brake 10 no longer works with zero backlash. However, in practice this can be neglected, because operating states in which increased input forces $F_A$ are required only rarely occur, and additionally in such operating states any crossing of the actuator backlash can be tolerated.

As has already been briefly indicated, the coefficient of friction $\mu$ can change relatively strongly depending on the load on the brake. However, every change of the coefficient of friction during a braking event results in a change of the friction force $F_F$, and thus to a changing delay of the brake component which is to be braked, and which mainly consists of the brake disc 14. To fully stabilise these unwanted changes of coefficient of friction, the shown disc brake 10 is provided with sensors (not shown), which make it possible to measure the friction force continuously. These sensors, which are known in themselves, are connected to an electronic controller (also not shown), which evaluates the received signals and in particular compares a specified setpoint value of the friction force with the actual value of the friction force. Correspondingly to this evaluation of the signals, the controller controls the drive mechanisms 34, 34' in such a way that by pushing the wedge 18 in or against the direction of rotation of the brake disc 14, the actual value of the friction force is raised or lowered, to bring the actual friction force value to the setpoint friction force value.

In the shown embodiment, control of the friction force of the brake 10 is achieved by position control of the wedge 18. This is advantageous from a control engineering point of view, because between the wedge position and the coefficient of friction $\mu$ there is only a linear relationship, which can be controlled simply, quickly, and reliably, for instance with cascade control including an outer control loop and an inner control loop. In the outer control loop, the (desired) braking moment is the controlled variable, and the wedge position is the manipulated variable. In the inner control loop, the wedge position is the controlled variable, and the motor current or motor voltage of the electric motors 36, 36' of the drive mechanisms 34, 34' is the manipulated variable. Because the actuation of the wedge 18 has zero backlash in the normal case, the position of the wedge 18 can be determined precisely by the above-mentioned rotation angle sensors, which are contained in the electric motors 36, 36'.

In the shown embodiment, the angle of inclination $\alpha$ is constant over the feed or clamping path of the brake 10, or more precisely of the wedge 18. In embodiments which are not shown, the angle of inclination $\alpha$ is degressive, i.e. it decreases as the feed path progresses.

What is claimed is:

1. Electromechanical brake (10), especially for vehicles, comprising an electrical actuator generating an actuation force and acting upon at least one friction member (16) in order to press said member to elicit a friction force against a rotational component (14), which is to be braked, of the brake, and a self-boosting device arranged between the friction member (16) and the electrical actuator, said device servicing to self-boost the actuation force generated by the electrical actuator, and having at least one wedge (18) with an angle of inclination a that is supported on a corresponding counter bearing (22), characterized in that the electrical actuator has two drive mechanisms (34, 34') which act on the wedge (18) and can work against each other to generate the actuation force, and that in the range of low actuation forces, i.e. in a range tan $\alpha \approx \mu$, where $\mu$ is the coefficient of friction between the friction member (16) and the component (14) to be braked, the two drive mechanisms (34, 34') work against each other to generate the actuation force.

2. Brake according to claim 1, characterized in that in the range of low actuation forces, the two drive mechanisms (34, 34') pull on the wedge (18) to generate the actuation force, in such a way that a tensile force excess in the actuation direction, representing the actuation force, results.

3. Brake according to claim 1, characterized in that in the range of low actuation forces, the two drive mechanisms (34, 34') press on the wedge (18) to generate the actuation force, in such a way that a compressive force excess in the actuation direction, representing the actuation force, results.

4. Brake according to claim 1, characterized in that the working direction of the two drive mechanisms (34, 34') can be reversed, and that the two drive mechanisms (34, 34') work together to achieve higher actuation forces.

5. Brake according to claim 1, characterized in that the two drive mechanisms (34, 34') are in the form of linear actuators.

6. Brake according to claim 5, characterized in that each linear actuator has an electric motor (36, 36') with integrated spindle nut, a spindle in the form of a connecting rod (38, 38') and a rotation angle sensor.

7. Brake according to claim 6, characterized in that position of the wedge (18) is controlled.

8. Brake according to claim 7, characterized in that the position control is cascade control with an outer control loop, the controlled variable of which is the braking moment and the manipulated variable of which is the position of the friction member (16) which is joined to the wedge (18), and with an inner control loop, the controlled variable of which is the position (which is determined from the position signals of the linear actuators) of the friction member (16) which is joined to the wedge (18), and with an inner control loop, the controlled variable of which is the position (which is determined from the position signals of the linear actuators) of the friction member (16) which is joined to the wedge (18), and the manipulated variable is the motor current or motor voltage of the electric motors (36, 36') of the linear actuators.

9. Brake according to claim 1, characterized in that the wedge (18) for each of the two directions of rotation of the component to be braked, has at least one wedge surface (20, 20').

10. Brake according to claim 1, characterized in that the counter bearing (22) is supported on a caliper (26) which overlaps the component (14) to be braked.

11. Brake according to claim 10, characterized in that the component (14) to be braked is a brake disc and the caliper (26) is a sliding caliper.

12. Brake according to claim 1, characterized in that there is a device to compare a setpoint value of the friction force with the actual value of the friction force, and when the actual value deviates from the setpoint value, the device triggers the electrical actuator to increase or reduce the generated actuation force correspondingly, and thus make the actual value of the friction force equal to the setpoint value.

13. Brake according to claim 1, characterized in that the angle of inclination a decreases as the wedge (18) is increasingly moved in the actuation direction.

14. A brake according to claim 9, characterized in that each wedge surface (20, 20') has the same angle of inclination α.

* * * * *